United States Patent [19]

Finke et al.

[11] Patent Number: 4,868,272
[45] Date of Patent: Sep. 19, 1989

[54] MOLDING MATERIALS, CONTAINING IMIDE GROUP-CONTAINING AROMATIC POLYAMIDES AND PROCESS FOR THEIR PREPARATION

[75] Inventors: Juergen Finke, Marl; Martin Bartmann, Recklinghausen; Friedrich-Georg Schmidt, Muenster, all of Fed. Rep. of Germany

[73] Assignee: Huels Aktiengesellschaft, Marl, Fed. Rep. of Germany

[21] Appl. No.: 250,610

[22] Filed: Sep. 29, 1988

[30] Foreign Application Priority Data

Jan. 19, 1988 [DE] Fed. Rep. of Germany ....... 3801287

[51] Int. Cl.$^4$ .............................................. C08G 73/10
[52] U.S. Cl. .................................... 528/172; 528/125; 528/128; 528/171; 528/172; 528/173; 528/184; 528/185
[58] Field of Search ............... 528/125, 128, 171, 172, 528/173, 184, 185

[56] References Cited

U.S. PATENT DOCUMENTS 4,786,706 11/1988 Kock et al. ......................... 528/128

Primary Examiner—Harold D. Anderson
Assistant Examiner—T. Mason
Attorney, Agent, or Firm—Oblon, Spivak, McClelland, Maier & Neustadt

[57] ABSTRACT

A molding material comprising an imide group-containing aromatic polyamide, obtained by polycondensation of (A) an aromatic diamine of the general formula $$H_2N-Ar-O-Ar'-X-Ar'-O-Ar-NH_2$$

wherein Ar and Ar' are m- or p-phenylene groups and X is $-SO_2-$ or $-CO-$, with at least one aromatic dicarboxylic acid B) selected from the group consisting of (B1) a mixture comprising 40 to 100 mole % of an acid of the structure

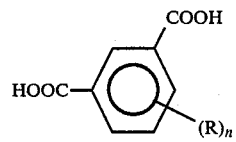

and 60 to 0 mole % of an acid of the structure

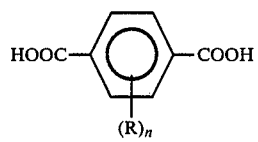

in which n is 0–4 and R is selected from the group consisting of
(a) an alkyl group having 1–6 carbon atoms,
(b) an unsubstituted phenyl or an alkyl- or aryl substituted phenyl group,
(c) an alkoxy group having 1–6 atoms,
(d) a phenoxy group, in which the phenyl ring is unsubstituted or is alkyl- or aryl substituted, and
(e) a halogen, (B2) an acid of the structure

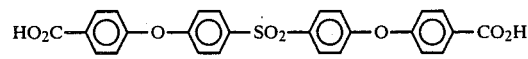

and (B3) a dicarboxylic acid of the formula $$HO_2C-Ar-(A-Ar)_p-CO_2H$$

wherein Ar is m-phenylene or p-phenylene, $A = -O-$, $-S-$, $-SO_2-$, or $-CO-$, and $p=0$ or 1, and (C) an aromatic dicarboxylic acid anhydride of the formula

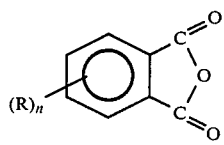

in which R and n are as defined above.

11 Claims, No Drawings

MOLDING MATERIALS, CONTAINING IMIDE GROUP-CONTAINING AROMATIC POLYAMIDES AND PROCESS FOR THEIR PREPARATION

BACKGROUND OF THE INVENTION

1. Field of the Invention:

The present invention relates to molding materials which contain the imide group-containing aromatic polyamides and are characterized by substantially improved processability, and a process for their preparation.

2. Discussion of the Background:

Aromatic polyamides, based on aromatic dicarboxylic acids and aromatic diamines having the general formula $$H_2N-Ar-X-Ar'-Y-Ar'-X-Ar-NH_2$$

are characterized not only by stability at high temperatures and good mechanical properties; but they are also thermoplastically processible (see Elias/Vohwinkel, "New Polymer Materials for Industrial Application", 2nd Edition,. Carl Hanser Verlag 1983, pp. 242 f.). In this formula the X stands for an ether oxygen; and Y, for the sulfonyl or carbonyl group; and Ar and Ar' stand independently of one another for the p- and m-phenylene group. The preparation of these polyamides can be found in the literature.

Broade et al describe for example the preparation of 4,4'-[sulfonylbis(p-phenylenoxy)]dianiline (X=O, Y=-SO$_2$) from p-aminophenol and 4,4'-dichlorodiphenylsulfone and its condensation with aromatic acid chlorides such as terephthalic acid chloride, in organic solvents to form aromatic polyamides having a glass transition temperatures (Tg) ranging from 230° to 320° C. (Polymer Prepr. Am. Chem. Soc. Div. Pol. Chem., Vol 15, 1974, p. 761, and Adv. Chem. Ser., 1975, p. 142; cf. CA, Vol 84, pp. 5530 ff).

DE-OS 35 39 846 discloses aromatic polyamides, which are obtained through polycondensation of aromatic diamines having formula I with aromatic dicarboxylic acids in solvents such as sulfolane in the presence of triphenylphosphite or an acid having the formula H$_3$PO$_n$ where n=2, 3 or 4. The preparation processes, which make use of an organic solvent, are expensive from a commercial point of view since the polycondensate has to be precipitated by addition of a so-called "insoluble agent", removed by filtration, liberated from the solvent residues by boiling, dried and concentrated in order to be further processed.

The process of DE-OS 36 09 011 permits on the other hand, the preparation of these polycondensates in the melt of the starting products, thus eliminating the aforementioned drawbacks.

Of course, the melt viscosity of these aromatic polyamides is very high. The result is that during the preparation in the melt and during processing the temperatures must range from 350° to 400° C. Under these conditions, a noticeable decomposition of the polycondensate occurs. Consequently the color and the mechanical properties of the molded products produced deteriorate.

The melt viscosity of highly viscous polymers can drop by adding so-called flow improvers or processing agents (see for example JP-OS 85/245,666, WO 86/03193, JP-OS 85/252,655, JP-OS 85/255, 847, JP-OS 85/255, 848). However, the drawback is that the low molecular weight additives can be leached out and result in stress cracking. With a thermal load these substances are "sweated out" (diffusion to the surface of the molded products) and change the mechanical properties of the polymers.

It is known that at a specific temperature, the melt viscosity is dependent on the molecular weight. Therefore, it should be theoretically possible to obtain polyamides having low melt viscosity by controlling the molecular weight. If, for example, an excess of the dicarboxylic acid or the diamino component is added, products, whose molecular weight is dependent on the molecular ratio of the starting components, are obtained. However, with high processing temperatures it cannot be avoided that the reactive end groups that are present split the chain or undergo other undesired side reactions. It has been observed that the component of which an excess has been added is split off and finally results in a molar ratio of 1:1.

It is also known that special compounds, so-called molecular weight controllers can be added during polycondensation. In Japanese Published Application 86/44,928 aromatic aminocarboxylic acids and monoamides of aromatic diamines are proposed for this purpose. In principle, the same reservations as explained above apply to these compounds. If an aromatic tri- or tetracarboxylic acid is added as a controller, as proposed in the JP-OS 86/44 929, cross-linkages are unavoidable.

It is also known that blends of low and high molecular weight polyamides have a lower melt viscosity. However, if such blends are subjected to the normal temperatures during processing, the result is re-amidations, whereby readily volatile components diffuse out.

Thus in the JP-OS 81/98,260 blends comprising aromatic polyamides having the general formula $$(-NH-Ar-NH-CO-Ar-CO-)$$

are claimed, which can be differentiated by their viscosity and consequently also by their molecular weight. However, from the experimental part one can only learn that 2 infusible oligoamides of almost the same molecular weight are mixed.

Thus no molding materials, based on polyamides with the diamine component of formula I and specific molecular weight, exist in prior art, which are thermoplastically processible below 350° C., without resulting in decomposition.

SUMMARY OF THE INVENTION

Accordingly, one object of the present invention is to provide a molding material which is processible below 350° C. without decomposition.

This and other objects which will become apparent from the following specification have been achieved by the present molding material which comprises an imide group-containing aromatic polyamide, obtained by polycondensation of (A) an aromatic diamine of the general formula $$H_2N-Ar-O-Ar'-X-Ar'-O-Ar-NH_2$$

wherein Ar and Ar' are m- or p-phenylene groups and X is —SO$_2$— or —CO—, with at least one aromatic dicarboxylic acid selected from the group consisting of (B1) a mixture comprising 40 to 100 mole % of an acid of the structure

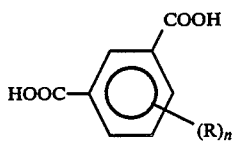

and 60 to 0 mole % of an acid of the structure

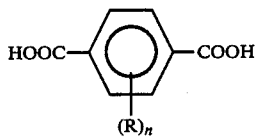

in which n is 0–4 and R is selected from the group consisting of
(a) an alkyl group having 1–6 carbon atoms,
(b) an unsubstituted phenyl group or an alkyl-or aryl substituted phenyl group,
(c) an alkoxy group having 1–6 atoms,
(d) a phenoxy group, in which the phenyl ring is unsubstituted or can be alkyl- or aryl substituted, and
(e) a halogen,
(B2) an acid of the structure

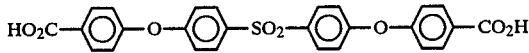

and
(B3) a dicarboxylic acid of the formula

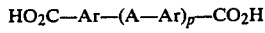

wherein Ar is m-phenylene or p-phenylene, A is —O—, —S—, —SO$_2$—, or —CO—, and p=0 or 1, and
(C) an aromatic dicarboxylic acid anhydride of the formula

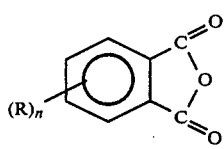

in which R and n are as defined above.

DETAILED DESCRIPTION OF THE PREFERRED EMBODIMENTS

The polyamides of the present invention which are obtained by the polycondensation of (i) an aromatic diamine A having the general formula

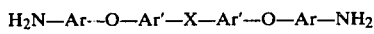

in which Ar, Ar' are a m or p-phenylene group, and X=—SO$_2$— or —CO— with (ii) an aromatic dicarboxylic acid or an aromatic dicarboxylic acid blend B and (iii) an aromatic dicarboxylic acid anhydride C. Preferred acid component B include B1-blends comprising 40 to 100 mole % of an acid having the general structure

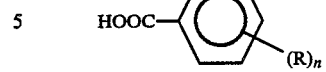

and up to 60 mole % of an acid having the general structure

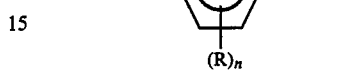

in which n is a number between 0 and 4 and R is an alkyl group having 1 to 6 carbon atoms, and, if desired, an alkyl or aryl-substituted phenyl group, an alkoxyl group having 1 to 6 carbon atoms, a phenoxy group or a halogen,
B2-an acid having the structure

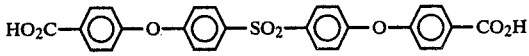

B3-dicarboxylic acid having the general formula

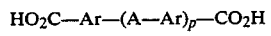

in which Ar is m-phenylene or p-phenylene, A is —O—, —S—, —SO$_2$—, —CO— and p=0 or 1.

The aromatic dicarboxylic acid anhydride C has the general structure

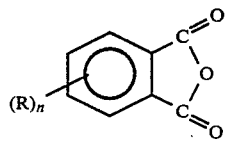

in which R and n have the aforementioned meanings.

Based on 1 mole of a component A, the aromatic polyamide contains 0.9 to 1.1 mole B and 0.001 to 0.2 mole C. 4,4'-bis(4-aminophenoxy)diphenylsulfone and 4,4'-bis(4-aminophenoxy)benzophenone are preferred as aromatic diamine A. Preferably, the parameter n in the B1acid component has the value 0.

With the present molding materials the following advantages can be identified:

1. The aromatic polyamides have a high temperature stability and yet are readily processible due to their surprisingly low melt viscosity.

2. Under the processing conditions, the molecular weight of the polyamides does not change.

3. It is surprising that the conversion with the phthalic anhydride procedes not only quantitatively but also irreversibly.

It is known from J. Polym. Sci., Vol 19 (1975), p. 651, that towards the end of the polymerization of 4-chloroformylphthalic anhydride with 4,4'-diaminodiphenyl ether, aniline or phthalic anhydride can be added; yet this does not result in an improvement in polymer properties. Under the reaction conditions given by the authors, no cyclodehydration to imide takes place; and the phthalic anhydride reacts only with a carboxylic acid function to an amide carboxylic acid. This reference in the literature is even less suggestive to one skilled in the art since apparently no polyamides with stable molecular weight are obtained.

The aromatic diamine A has the general formula:

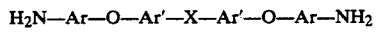

in which Ar and Ar' are m- or preferable p-phenylene groups. X stands for the groups —CO— or preferably —SO$_2$—.

A suitable acid component B is one of the following components B1, B2, B3 or a mixture thereof.

The acid component B1 is an isophthalic acid having the general structure

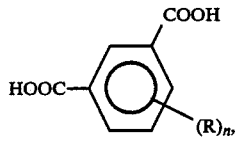

which can be replaced up to 60 mole % by a terephthalic acid having the general structure

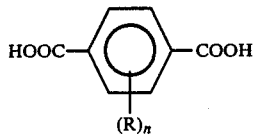

where n is a whole number between 0 and 4, preferably 0 or 1. R is an alkyl group having 1 to 6 carbon atoms, a phenyl group, which can be C$_{1-10}$ alkyl- or aryl substituted, an alkoxy group having 1 to 6 carbon atoms, a phenoxy group, whose phenyl ring can be C$_{1-10}$ alkyl- or aryl-substituted, or a halogen, in particular chlorine and bromine.

The acid component B2 is an acid having the structure

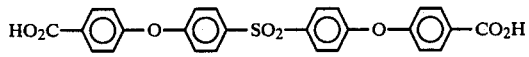

The acid component B3 is an acid having the formula

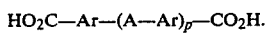

In this structure Ar, independently, stands for the m- or preferably the p-phenylene group, A is a bivalent group selected from —O—, —S—, —SO$_2$— and —CO— and p has the value of either 0 or 1.

An important feature of the present invention is component C, an aromatic dicarboxylic acid anhydride having the general structure

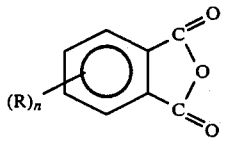

in which R and n have the aforementioned meanings.

The molding materials of the invention are obtained by polycondensation of the aforementioned starting compounds (i), (ii) and (iii) in the presence of a phosphorus-containing catalyst. Preferably the phosphorus compounds are in an oxidation state from 5 to 1 such as triphenylphosphite or, in particular, hypophosphorous acid.

It is recommended that a tertiary nitrogenous base be added as well. Dialkylaminopyridines, in particular 4-dimethylaminopyridine, have proven to be especially suitable.

The reaction is normally conducted at temperatures ranging from 220° to 350° C. either in a solvent or preferably in the melt. Suitable solvents are described, e.g., in the DE-OS 35 39 846. Sulfolane is preferred.

The process in the melt can be carried out for example in such a manner that at first an oligomer is prepared batchwise and then a secondary condensation is carried out, for example in an extruder applying a vacuum. If necessary, additives such as pigments, UV stabilizers, anti-oxidants and filler can be added.

The molding materials of the invention may be manufactured into molded products, which can be used for example in the automobile sector. Another area of the application is printed circuit boards for printed circuits.

Other features of the invention will become apparent during the course of the following descriptions of exemplary embodiments which are given for illustration of the invention and are not intended to be limiting thereof.

EXAMPLES

EXAMPLE 1

60.00 g (0.139 mole) 4,4'-bis(4-aminophenoxy)diphenylsulfone 22.92 g (0.138 mole) isophthalic acid 0.3 g (0.002 mole) phthalic anhydride The starting materials were stirred with 0.67 ml of 50% aqueous hypophorous acid and 0.508 g of dimethylaminopyridine for 20 minutes at 250° C., 10 minutes at 300° C. and 40 minutes at 330° C. under nitrogen in a polycondensation reactor, which was equipped with a feed system for nitrogen and a distillation condensor. During the subsequent solid condensation of the oligomer under a pressure of 1 mbar, the viscosity increased after 2 hours at 200° C., 2 hours at 230° C., 2 hours at 250° C. and 3 hours at 280° C. from $\eta_{rel}=0.44$ cm$^3$/g to 1.09 cm$^3$/g (phenol/o-dichlorobenzene, 1:1).

EXAMPLE 2

42.25 g (0.10 mole) 4,4'-bis-(4-aminophenoxy)phenylsulfone 23.24 g (0.09 mole) phenoxyterephthalic acid 1.40 g (0.009 mole) terephthalic acid 0.30 g (0.002 mole) phthalic anhydride 100 μl of 50% aqueous hypophosphorous acid 122 mg dimethylaminopyridine The starting materials were melted at 300° C. in the polycondensation reactor. After a few minutes the water produced by the reaction formed and was removed continuously by distillation during the course of the reaction. After 20 minutes the temperature was increased to 320° C. and held for 20 minutes at this temperature. The golden brown reaction product had a viscosity number J of 40 cm$^3$/g. The product was recondensed for 13 hours in the solid phase, whereby the temperature was gradually increased from 200° to 260°

C. The J value increased to 63 cm³/g. The DSC curve showed a glass temperature of 220° C.

EXAMPLE 3

20.02 g (0.10 mole) 4,4'-diaminodiphenyl ether
23.24 g (0.09 mole) phenoxyterephthalic acid
1.49 g (0.009 mole) isophthalic acid
0.30 g (0.02 mole) phthalic anhydride
272 μl of 50% aqueous hypophosphorous acid
305 mg dimethylaminopyridine The starting materials were heated in 150 ml sulfolane for 2 hours to 230° C. and for four hours to 250° C. The water, which was formed in the course of the reaction, was continuously removed by distillation. The chilled reaction solution was diluted with 300 ml N-methylpyrrolidone and poured under vigorous stirring into 2,000 ml of a mixture comprising methanol and water in a ratio of 8:2. The colorless product was siphoned off and washed with methanol. 42.7 g of a polyamide having a J value of 126 cm³/g (measured in conc. $H_2SO_4$) were obtained.

EXAMPLE 4

21.62 g (0.05 mole) 4,4'-bis-(4-aminophenoxy)diphenylsulfone
12.88 g mole) phenoxyterephthalic acid
0.07 g (0.0005 mole) phthalic anhydride
272 μl of 50% aqueous hypophosphorous acid
305 mg dimethylaminopyridine The starting materials were reacted in the same manner as in Example 3. 31.5 g of a polyamide having a J value of 71 cm³/g (measured in conc. $H_2SO_4$) were obtained.

EXAMPLE 5

865 g (2.00 mole) 4,4'-bis-(4-aminophenoxy)diphenylsulfone
328.94 g (1.98 mole) isophthalic acid
5.93 g (0.04 mole) phthalic anhydride
1.09 ml of 50% aqueous hypophosphorous acid
122 g dimethylaminopyridine The starting materials were melted at 250° C. in the polycondensation reactor and stirred for 1 hour at 250° C. In the course of 10 minutes, the temperature was increased to 300° C., after another 10 minutes then to 350° C. and held for 10 minutes at this temperature. The product obtained had a J value of 28 cm³/g (measured in the mixture comprising phenol and 1,2-dichlorophenol in a ratio of 1:1). The subsequent 17 hour solid phase secondary condensation at 260° C. yielded a product having a J value of 80 cm³/g in a mixture of phenol and 1,2-dichlorobenzene. The MVI value (melt viscosity index) at 340° C. was 2.73 g/10 min. at a pressure of 21.6 kg.

EXAMPLE 6

64.87 g (0.15 mole) 4,4'-bis-(4-aminophenoxy)diphenylsulfone
23.05 g (0.13875 mole) isophthalic acid
3.33 g (0.0225 mole) phthalic anhydride
109 μl of 50% aqueous hypophosphorous acid
122 g dimethylaminopyridine The starting materials were melted at 250° C. in the polycondensation tube, stirred for 20 minutes and then condensed for 10 minutes at 300° C. and 20 minutes at 320° C. The J value of the product was 27 cm³/g (measured in a mixture comprising phenol and 1,2-dichlorobenzene in a ratio of 1:1). After 17 hours of solid phase secondary condensation at 240° C., the J value was 33 cm³/g.

EXAMPLE 7

A mixture comprising 100 parts by weight of the polyamide, prepared according to Example 5, and 2 parts by weight of the polyamide, prepared according to Example 6, had a MVI value of 3.76 cm³/10 min. at 340° C. under a pressure of 21.6 kg.

EXAMPLE 8

A mixture comprising 100 parts by weight of the polyamide, prepared according to Example 5, and 5 parts by weight of the polyamide, prepared according to Example 6, had a MVI value of 4.94 cm³/10 min. at 340° C. under a pressure of 21.6 kg.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A molding material comprising an imide group-containing aromatic polyamide, obtained by polycondensation of (A) an aromatic diamine of the formula

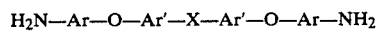

$H_2N—Ar—O—Ar'—X—Ar'—O—Ar—NH_2$ wherein Ar and Ar' are m- or p-phenylene groups and X is $—SO_2—$ or $—CO—$, with at least one aromatic dicarboxylic acid (B) selected from the group consisting of (B1) a mixture comprising 40 to 100 mole % of an acid of the structure

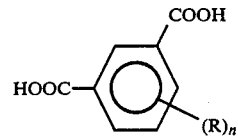

and 60 to 0 mole % of an acid of the structure

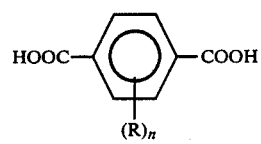

in which n is 0–4 and R is selected from the group consisting of
(a) an alkyl group having 1–6 carbon atoms,
(b) an unsubstituted phenyl group or an alkyl- or aryl substituted phenyl group,
(c) an alkoxy group having 1–6 atoms,
(d) a phenoxy group, in which the phenyl ring is unsubstituted or is alkyl- or aryl substituted, and
(e) a halogen,
(B2) an acid of the structure

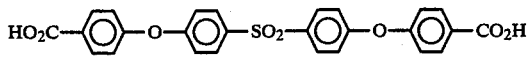

and
(B3) a dicarboxylic acid of the formula

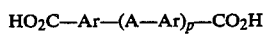

wherein Ar is m-phenylene or p-phenylene, A=—O—, —S—, —SO$_2$—, or —CO—, and p=0 or 1, and (C) an aromatic dicarboxylic acid anhydride of the formula

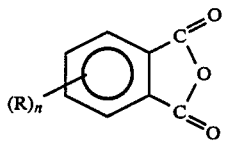

in which R and n are as defined above.

2. The molding material of claim 1, wherein the aromatic polyamide comprises 0.9 to 1.1 moles of component B and 0.001 to 0.2 moles of component C based on 1 mole of component A.

3. The molding material of claim 1, wherein said aromatic diamine is 4,4'-bis(4-aminophenoxy)diphenylsulfone.

4. The molding of claim 1, wherein said aromatic diamine is 4,4'-bis(4-aminophenoxy)benzophonone.

5. The molding material of claim 1, wherein n=0 in component B1.

6. The molding material of claim 1, wherein said aromatic dicarboxylic acid is isophthalic acid.

7. The molding material of claim 1, wherein said polycondensation is conducted in the presence of a phosphorus-containing catalyst.

8. The molding material of claim 7, wherein said phosphorus-containing catalyst is triphenylphosphite or hypophosphorus acid.

9. The molding material of claim 7, wherein said polycondensation is conducted in the presence of a tertiary nitrogenous base.

10. The polycondensation of claim 9, wherein said base is a dialkylaminopyridine.

11. The molding material of claim 1, wherein said polycondensation is conducted at a temperature between 220°–350° C.

* * * * *